United States Patent [19]

Aburomia et al.

[11] Patent Number: 5,295,171

[45] Date of Patent: Mar. 15, 1994

[54] COMBINED JET PUMP AND INTERNAL PUMP RERCIRCULATION SYSTEM

[75] Inventors: Momtaz M. Aburomia, Palo Alto; Larry E. Fennern, San Jose, both of Calif.

[73] Assignee: General Electric Company, San Jose, Calif.

[21] Appl. No.: 46,322

[22] Filed: Apr. 15, 1993

[51] Int. Cl.⁵ ............................................. G21C 15/24
[52] U.S. Cl. ..................................... 376/372; 376/370
[58] Field of Search ................. 376/370, 372, 379, 373

[56] References Cited

U.S. PATENT DOCUMENTS

| | | | |
|---|---|---|---|
| 3,437,559 | 4/1969 | Junbermann et al. | 176/87 |
| 3,838,002 | 9/1974 | Gluntz et al. | 176/65 |
| 4,663,116 | 5/1987 | Masuhara et al. | 376/377 |
| 4,696,792 | 9/1987 | Hobson | 376/377 |
| 4,847,043 | 6/1989 | Gluntz | 376/372 |
| 5,082,620 | 1/1992 | Fennern | 376/373 |
| 5,124,115 | 6/1992 | Dillmann | 376/372 |

Primary Examiner—Frederick H. Voss
Attorney, Agent, or Firm—J. S. Beulick

[57] ABSTRACT

A recirculation system for driving reactor coolant water in a downcomer within a reactor pressure vessel includes a jet pump disposed in the downcomer and having a suction inlet at the top thereof and an outlet at the bottom thereof. A reactor internal pump is joined directly to the pressure vessel at an access nozzle thereof and includes a housing sealingly joined to the access nozzle, and in serial flow communication an inlet channel, an impeller, an outlet channel, and an injector nozzle. The inlet channel carries coolant water from the pressure vessel to the impeller which pressurizes the coolant water and returns it through the outlet channel and the injector nozzle for injection into the jet pump inlet. The water injected from the internal pump into the jet pump drives the jet pump for effecting recirculation flow within the pressure vessel.

7 Claims, 3 Drawing Sheets

COMBINED JET PUMP AND INTERNAL PUMP RECIRCULATION SYSTEM

The present relates generally to nuclear reactors, and, more specifically, to a recirculation system for circulating coolant water through a reactor core inside a pressure vessel.

BACKGROUND OF THE INVENTION

A typical boiling water reactor (BWR) includes a pressure vessel containing a nuclear reactor core submerged in coolant water therein. The reactor core is effective for boiling the coolant water for generating steam which is discharged from the pressure vessel and used for producing power, such as powering a steam turbine-generator for producing electricity.

In order to cool the reactor core, a recirculation system is provided and includes an annular downcomer disposed between the reactor core and the inside of the pressure vessel, and suitable pumps for channeling the coolant water downwardly through the downcomer to a lower plenum of the pressure vessel wherein it is turned upwardly and through the reactor core for its cooling. As the water flows upwardly through the reactor core it is heated thereby for generating steam which is channeled upwardly from the reactor core.

Various types of pumps are known for providing recirculation in a reactor pressure vessel having various advantages and disadvantages. For example, conventional jet pumps may be disposed vertically inside the downcomer and include a suction inlet at a top end thereof and an outlet at the bottom end thereof. An injector nozzle is disposed at the suction inlet for injecting pressurized water which provides energy for operating the jet pump to create suction at the inlet for drawing in a portion of the coolant water from the downcomer. The water drawn in is then channeled through the conventionally configured jet pump housing wherein it is mixed with the injected water and diffused for providing pressurized water at its outlet having a suitable flow rate and pressure for providing recirculation to the reactor core. The injector nozzle is typically joined to external piping for receiving the pressurized water from a conventional driving pump located remotely from the pressure vessel. The remotely located driving pump and external pipes increase the complexity of the overall power plant and correspondingly require increased space in the reactor building and increased maintenance for ensuring the proper operation thereof.

Another type of pump used for recirculation flow in a reactor pressure vessel is conventionally known as a reactor internal pump (RIP) which is sealingly joined to the pressure vessel and forms a part thereof. In this way, no external pipes are required as in the above example having the remotely located pump. RIPs include a conventional impeller which is suitable sized and configured for providing a suitable flow rate and pressure for recirculating the coolant water through the reactor core. The impellers are typically configured for providing relatively low-head and high-flow to effectively meet the recirculation flow requirements of a typical reactor. However, one disadvantage of an impeller driven RIP is that during a power failure, the impeller will stop rotating and present resistance to natural recirculation flow of the coolant water inside the pressure vessel. Accordingly, suitable design provision must be provided to ensure effective recirculation flow of the coolant water in the event of a power failure which stops rotation of the impeller and results in a degraded natural circulation flow.

Impeller driven RIPs may be mounted below the lower head of the pressure vessel or may be side-mounted on the pressure vessel. The bottom mounted RIPs require suitable access space under the pressure vessel which requires a taller containment building and increases the difficulty of maintaining the RIPs in the limited and congested space under the pressure vessel. Side mounted RIPs, on the other hand, free up space below the pressure vessel and are readily accessible for improved ease of maintenance.

However, a suitable number of impeller-driven RIPS for obtaining the required overall recirculation flow rate through the reactor core typically requires low-head and high-flow configurations to be practical. High flow through the RIPs in turn requires a correspondingly large RIP and, unless the impeller is installed inside the reactor pressure vessel, a correspondingly large nozzle through the pressure vessel for channeling the coolant water therebetween. Larger nozzles increase the complexity and cost of the pressure vessel since the pressure vessel must be suitably designed for accommodating the relatively high pressures caused from the generation of steam therein.

SUMMARY OF THE INVENTION

A recirculation system for driving reactor coolant water in a downcomer within a reactor pressure vessel includes a jet pump disposed in the downcomer and having a suction inlet at the top thereof and an outlet at the bottom thereof. A reactor internal pump is joined directly to the pressure vessel at an access nozzle thereof and includes a housing sealingly joined to the access nozzle, and in serial flow communication an inlet channel, an impeller, an outlet channel, and an injector nozzle. The inlet channel carries coolant water from the pressure vessel to the impeller which pressurizes the coolant water and returns it through the outlet channel and the injector nozzle for injection into the jet pump inlet. The water injected from the internal pump into the jet pump drives the jet pump for effecting recirculation flow within the pressure vessel.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
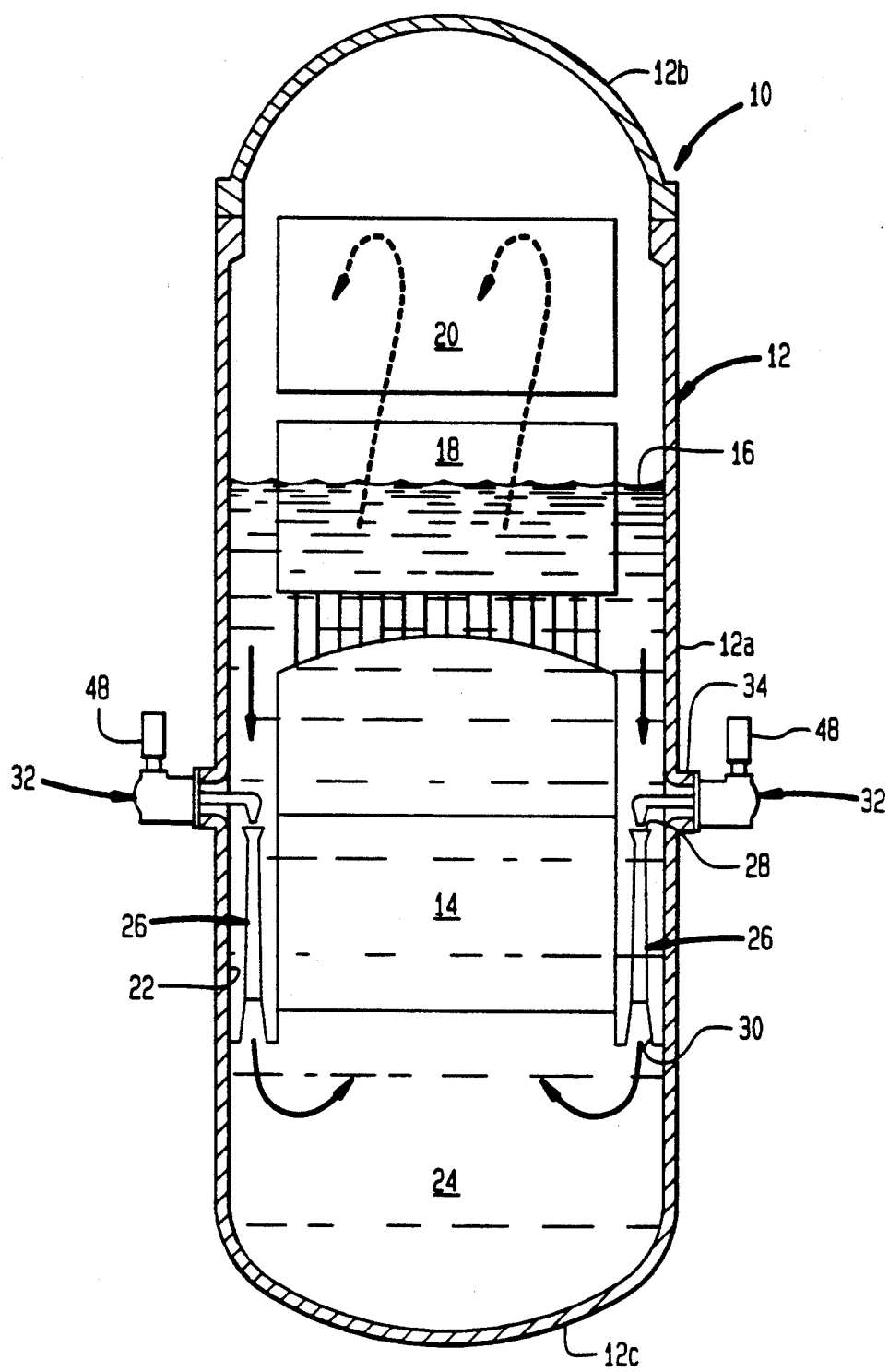
FIG. 1 is a schematic, elevational view of an exemplary boiling water reactor including a recirculation system having a reactor internal pump driving a jet pump for effecting recirculation within a pressure vessel.

Illustrated schematically in FIG. 1 is an exemplary boiling water reactor (BWR) 10 including an annular pressure vessel 12 having a cylindrical sidewall 12a and upper and lower heads 12b, 12c. Disposed inside the pressure vessel 12 is a conventional boiling water reactor core 14 submerged in reactor coolant water 16. The reactor core 14 is effective for boiling a portion of the coolant water 16 for generating stem (shown in dashed line) which is channeled upwardly through a conventional steam separator assembly 18 disposed above the core 14, and in turn through a conventional steam dryer 20 prior to its discharge from the pressure vessel 12 for use in producing power such as powering a conventional steam turbine-generator (not shown) for producing electrical power as is conventionally known.

In order to cool the core 14, a conventional annular downcomer 22 is defined in part between the inside surface of the pressure vessel 12 and the core 14 for channeling the coolant water 16 downwardly therein and into a lower plenum 24 disposed below the core 14 in which the circulating coolant water 16 is turned upwardly to flow through the reactor core 14. In order to effect the recirculation flow of the coolant water 16 in the pressure vessel 12, a recirculation system in accordance with one embodiment of the present invention is provided. More specifically, the recirculation system preferably includes a plurality of circumferentially spaced apart conventional jet pumps (JPs) 26 disposed vertically in the downcomer 22, with each JP 26 having a suction inlet 28 at a top end thereof for directly receiving from the downcomer 22 a first portion of the coolant water 16, and an outlet 30 at a bottom end thereof for discharging into the lower plenum 24 the coolant water 16 pressurized by the JP 26. In order to power the JPs 26, a suitable number of reactor internal pumps (RIPs) 32 are sealingly joined directly to the pressure vessel 12 at respective access nozzles 34 thereof which are disposed in flow communication with the downcomer 22. In the exemplary embodiment illustrated in FIG. 1, ten RIPs 32 are provided, with each RIP 32 powering one, or preferably two, of the JPs 26 for a typical configuration of a BWR 10 used for producing electrical power from a generator joined to an electrical power grid.

Figure 2:
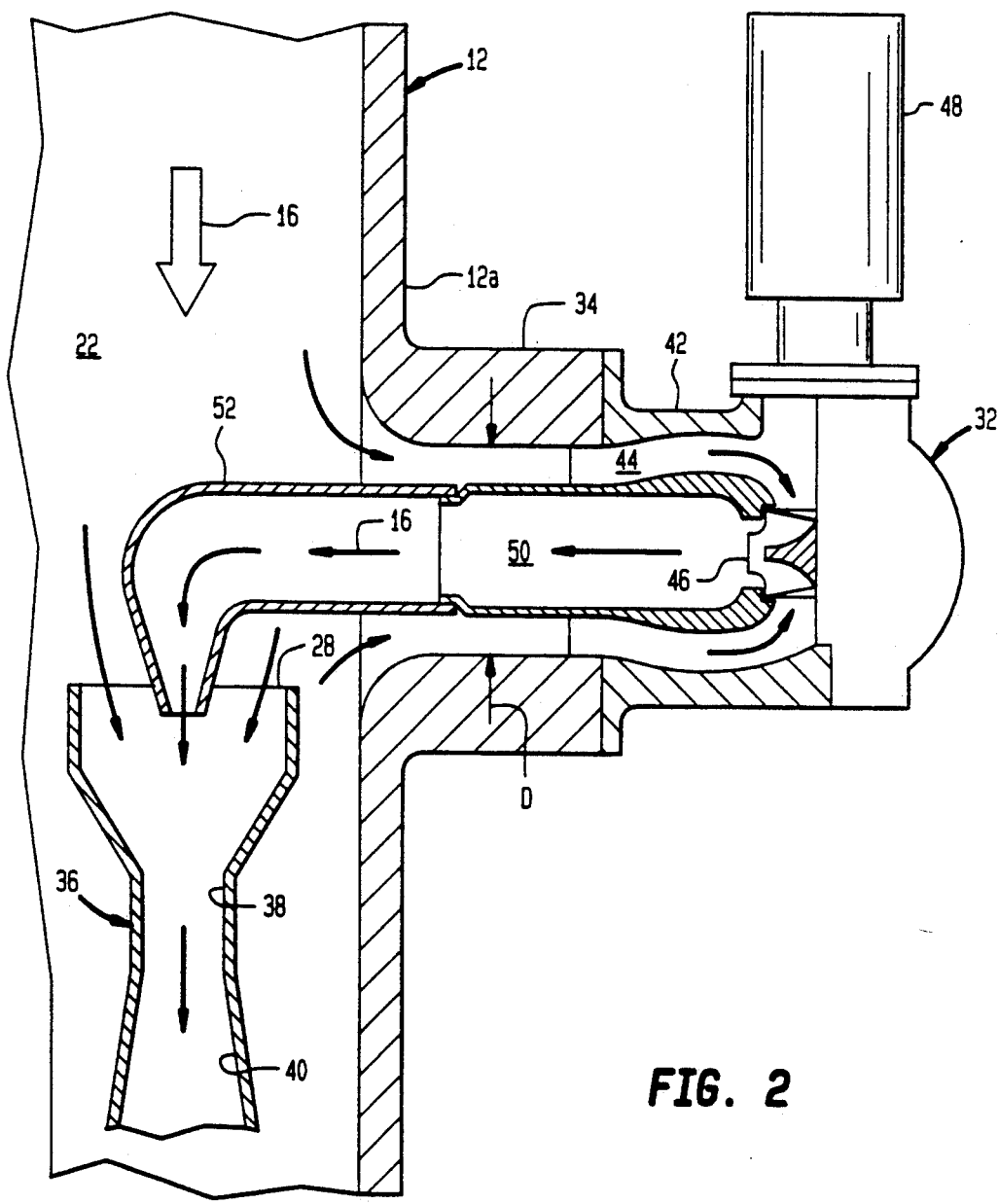
FIG. 2 is an enlarged, partly sectional schematic view of the reactor internal pump in accordance with one embodiment of the present invention providing a driving fluid to the jet pump illustrated in FIG. 1.

FIG. 2 illustrates in more particularity an exemplary first embodiment of the RIPs 32 and the JPs 26. Each of the JPs 26 is conventional and includes a specifically configured tubular housing 36 having the open inlet 28 facing vertically upwardly in the downcomer 22 for receiving therefrom without obstruction the first portion of the coolant water 16. The housing 36 further includes a conventional throat or mixing section 38 disposed in flow communication with the inlet 28 which is followed in turn by a conventional diffuser 40 disposed below the throat 38 which extends to the outlet 30 (see FIG. 1).

The RIP 32 includes in this exemplary embodiment a casing or housing 42 sealingly joined to the access nozzle 34 for containing the coolant water 16 therein and preventing leakage thereof from the pressure vessel 12. The housing 42 is therefore a part of the pressure vessel 12 and may be integrally formed therewith or suitably attached thereto by welding or bolting for allowing access of a second portion of the coolant water 16 through the nozzle 34 and into the RIP 32. The RIP 32 is characterized by the absence of any external pipes between the pressure vessel 12 and the RIP 32 since it is directly joined to the access nozzle 34. An inlet channel 44 extends through the housing 42 in flow communication with the access nozzle 34 for receiving from the downcomer 22 inside the pressure vessel 12 the second portion of the coolant water 16. A conventional rotary impeller 46 is contained in the housing 42 and disposed in flow communication with the inlet channel 44 for receiving and pressurizing or pumping the coolant water second portion. The impeller 46 is suitably joined to an electrical motor 48, for example, which rotates the impeller 46 for pumping the water 16. Also disposed inside the housing 42 is an outlet channel 50 disposed in flow communication with the impeller 46 for receiving therefrom the pressurized coolant water second portion for return to the downcomer 22.

An injector nozzle 52 is disposed in flow communication with the outlet channel 50 and is positioned in the downcomer 22 above the JP inlet 28 for injecting therein the pressurized coolant water second portion to drive the JP 26 for effecting suction at the JP inlet 28 for drawing the coolant water first portion therein from the downcomer 22. In this way, the RIP 32 is effective for powering the JP 26 with the collective volume of coolant water 16 entering the JP inlet 28 directly from the downcomer 22 and indirectly therefrom from the injector nozzle 52 providing a respective portion of the overall flow rate required for effecting suitable recirculation flow through the core 14.

The combined JP 26 and RIP 32 provides an effective combination of pumps for effecting suitable recirculation flow within the pressure vessel 12 without the external pipes typically found in a conventional jet pump recirculation system, and without the flow restriction attendant with a conventional reactor internal pump system upon a pump trip thereof. In the event of a pump trip wherein power to recirculation pumps is interrupted and the pumps become ineffective, the stationary impeller of a conventional reactor internal pump provides a flow restriction against the natural recirculation flow in the pressure vessel 12. However, in the embodiment illustrated in FIGS. 1 and 2, upon a pump trip of the RIP 32, the coolant water 16 is still allowed to flow without obstruction through the hollow JP housing 36 downwardly and into the lower plenum 24. The relatively cool coolant water 16 in the downcomer 22 will fall by gravity downwardly through the JP housing 36, with the relatively hot coolant water 16 in the core 14 flowing upwardly due to its lower density.

Accordingly, the JP 26 and RIP 32 combination illustrated in FIG. 2 allows unobstructed natural recirculation flow within the pressure vessel 12 in the event of a pump trip of the RIP 32, but when the RIP 32 is operational, it injects pressurized water from the injector nozzle 52 into the JP inlet 28 for powering the JP 26 and effecting the required flow rate therethrough. The combination of the JP 26 and the RIP 32 also permits better recovery from pump trip conditions and improves stability of the reactor core 14 under partial pump performance or natural circulation operating conditions.

Also in the embodiment illustrated in FIG. 2, the access nozzle 34 preferably extends laterally from the vertical sidewall 12a of the pressure vessel 12 at a suitable elevation relative to the core 14 and above the lower head 12c (see FIG 1), and the RIP 32 is sidemounted thereto. In this way, the area below the pressure vessel lower head 12c remains uncluttered with bottom-mounted RIPs, and the side-mounted RIPs 32 provide ready access for improving maintenance thereof.

In the preferred embodiment illustrated in FIG. 2, both the inlet and outlet channels 44 and 50 of the RIP 32 extend through a single access nozzle 34 and through the common pump housing 42. More specifically, the outlet channel 50 is disposed radially inwardly of the inlet channel 44 and generally coaxially therewith inside the access nozzle 34. The impeller 46 is horizontally mounted to a vertically extending drive shaft (not shown) and provides double suction from above and below as illustrated in FIG. 2.

The impeller 46 is conventionally configured for obtaining relatively high-head an low-flow of the second portion of the coolant water 16 pressurized thereby for decreasing the size of the access nozzle 34. The access nozzle 34 has an inner diameter D which is preferably made as small as possible for avoiding relatively large apertures through the pressure vessel 12 which improves the design thereof, and a high-head and low-flow RIP 32 permits this reduction. Accordingly, the RIP housing 42 may also be reduced in size along with the reduction in size of the access nozzle 34 for reducing cost while retaining suitable structural strength of the pressure vessel 12. Furthermore, the high-head and low-flow performance of the RIPs 32 also provide the suitable driving pressure for the coolant water 16 injected from the injector nozzle 52 into the JP inlet 28 for suitably powering the JP 26.

Figure 3:
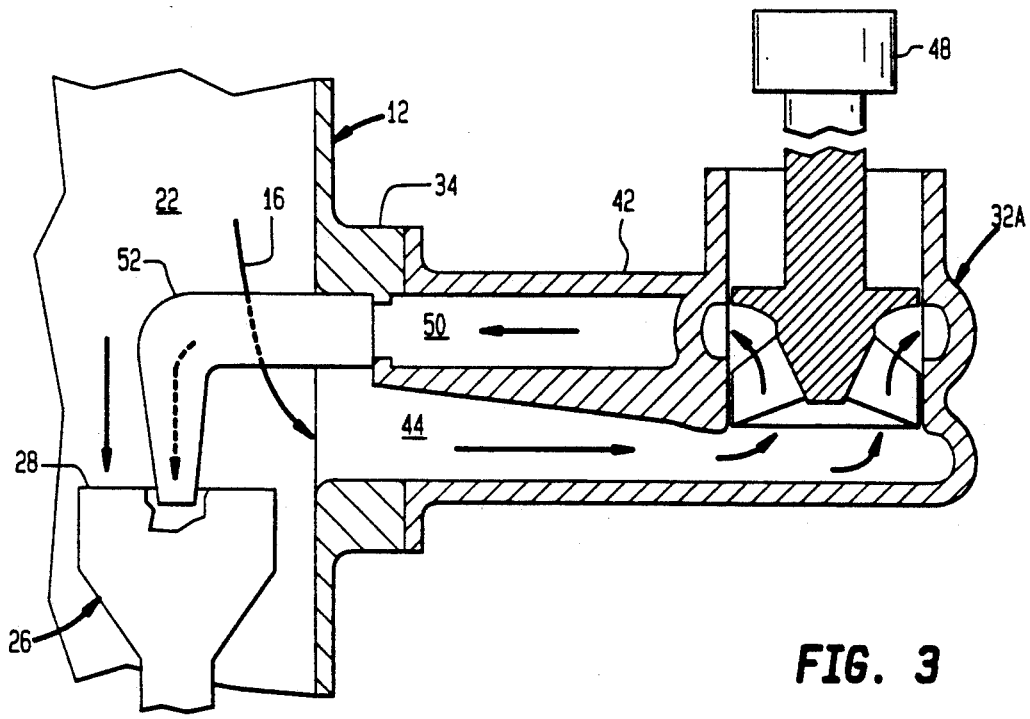
FIG. 3 is an enlarged, partly sectional schematic view of the reactor internal pump in accordance with a second embodiment of the present invention providing a driving fluid to the jet pump illustrated in FIG. 1.

Illustrated in FIG. 3 is a second embodiment of a reactor internal pump designated 32A. In this embodiment, the outlet channel 50 is disposed above the inlet channel 44 and generally parallel thereto inside the access nozzle 34, and the impeller 46 is horizontally mounted with its drive shaft extending vertically. In this embodiment, the impeller 46 is a single-suction impeller which receives the second portion of the coolant water 16 from below which is pumped through the impeller 46 upwardly and laterally into the outlet channel 50.

Figure 4:
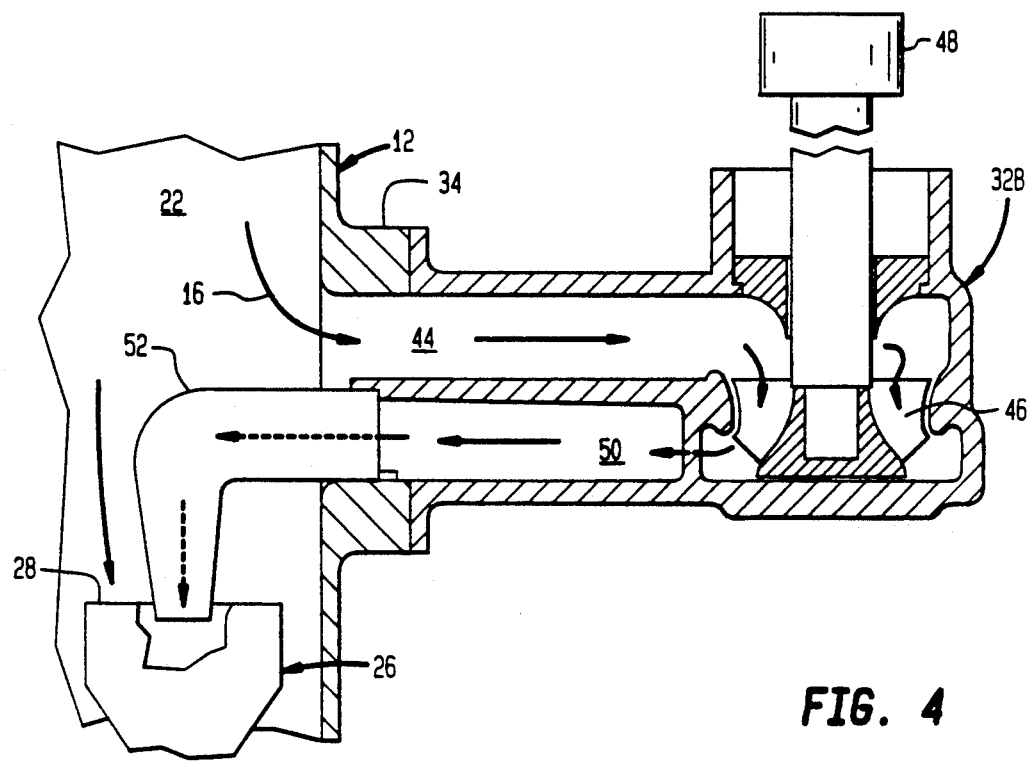
FIG. 4 is an enlarged, partly sectional schematic view of the reactor internal pump in accordance with a third embodiment of the present invention providing a driving fluid to the jet pump illustrated in FIG. 1.

FIG. 4 illustrates a third embodiment of the reactor internal pump designated 32B wherein the outlet channel 50 is disposed below the inlet channel 44 and generally parallel thereto inside the access nozzle 34. In this embodiment the impeller 46 is again horizontally disposed with its drive shaft extending vertically for providing another embodiment of a single-suction impeller receiving the second portion of the coolant water 16 from above and discharging it from its bottom.

Alternate embodiments of the RIP 32 may be suitable sealingly joined directly to the pressure vessel 12 for directly receiving the second portion of the coolant water 16 from the downcomer 22, and pressurizing it for injection through the injector nozzle 52 into the JP inlet 28 for powering the JP 26.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A recirculation system for driving reactor coolant water contained in an annular downcomer defined between a reactor pressure vessel and a reactor core spaced radially inwardly therefrom comprising:
   a jet pump disposed in said downcomer and having a suction inlet at a top end thereof for directly receiving from said downcomer a first portion of said coolant water, and an outlet at a bottom end thereof for discharging said coolant water pressurized by said jet pump;
   a reactor internal pump joined directly to said pressure vessel at an access nozzle thereof, said internal pump including:
      a housing sealingly joined to said access nozzle for containing said coolant water;
      an inlet channel extending through said housing in flow communication with said access nozzle for receiving from said pressure vessel a second portion of said coolant water;
      an impeller disposed in flow communication with said inlet channel for receiving and pressurizing said coolant water second portion;
      an outlet channel disposed in flow communication with said impeller for receiving therefrom said pressurized coolant water second portion; and
      an injector nozzle disposed in flow communication with said outlet channel and positioned above said jet pump inlet for injecting therein said pressurized coolant water second portion to drive said jet pump for effecting suction at said jet pump inlet for drawing said coolant water first portion therein.

2. A system according to claim 1 wherein said access nozzle extends laterally from a sidewall of said pressure vessel, and said internal pump is side-mounted thereto.

3. A system according to claim 2 wherein both said inlet and outlet channels of said internal pump extend through said access nozzle.

4. A system according to claim 3 wherein said impeller is configured for relatively high-head and low-flow of said coolant water second portion pressurized thereby for decreasing the size of said access nozzle.

5. A system according to claim 3 wherein said outlet channel is disposed radially inwardly of said inlet channel and coaxially therewith inside said access nozzle.

6. A system according to claim 3 wherein said outlet channel is disposed above said inlet channel and parallel thereto inside said access nozzle.

7. A system according to claim 3 wherein said outlet channel is disposed below said inlet channel and parallel thereto inside said access nozzle.

* * * * *